United States Patent [19]

Krezanoski

[11] 3,908,680

[45] Sept. 30, 1975

[54] METHODS FOR CLEANING AND BLEACHING PLASTIC ARTICLES

[75] Inventor: Joseph Z. Krezanoski, Los Altos, Calif.

[73] Assignee: Flow Pharmaceuticals, Inc., Palo Alto, Calif.

[22] Filed: Oct. 12, 1973

[21] Appl. No.: 405,751

[52] U.S. Cl. .................. 134/27; 134/26; 134/28; 134/29; 134/30; 134/42
[51] Int. Cl.² ............................................. B08B 3/10
[58] Field of Search ............. 134/26, 27, 42, 28, 29, 134/30, 16; 252/102; 21/5 B; 264/1, 233, 340, 342, 343, 344; 8/111, DIG. 6

[56] References Cited
UNITED STATES PATENTS

| | | | |
|---|---|---|---|
| 3,171,752 | 3/1965 | Rankin............................ | 424/329 X |
| 3,524,768 | 8/1970 | Miyashita et al. ................ | 134/27 X |
| 3,549,747 | 12/1970 | Krezanoski et al. .................. | 424/78 |
| 3,738,867 | 6/1973 | Franz................................ | 134/42 X |
| 3,829,329 | 8/1974 | O'Driscoll et al................. | 134/42 X |

OTHER PUBLICATIONS

Trager, *Manufacturing Optics International*, "Solutions for Soft Lenses," May, 1972, pp. 403–405.

Gassett, "Proceedings of the Symposium and Workshop of the U. of Fla., Gainesville: Soft Contact Lenses," 1972, pp. 247–248.

Rankin II, *Optometric Weekly*, Vol. 52, No. 21, May 25, 1961, pp. 1019–1020.

*Hackh's Chemical Dictionary*, Fourth ed., 1969, p. 337.

*Primary Examiner*—S. Leon Bashore
*Assistant Examiner*—Marc L. Caroff
*Attorney, Agent, or Firm*—Finnegan, Henderson, Farabow & Garrett

[57] ABSTRACT

Plastic articles are cleaned by successively immersing them in two aqueous solutions, with each solution containing an active oxygen yielding per compound and preferably a chelating agent. One of the solutions is formulated to be acidic and the other is formulated to be basic. After the article is removed from the last solution, it is treated with a non-ionic cleaner and then rinsed with water. The method produces a remarkable cleaning and bleaching action on dirty, discolored plastic compositions. This is particularly apparent when the method is applied to contact lenses.

24 Claims, No Drawings

METHODS FOR CLEANING AND BLEACHING PLASTIC ARTICLES

BACKGROUND OF THE INVENTION

This invention relates to cleaning and restoring methods for synthetic plastic articles such as various contact lenses. More particularly, this invention relates to methods for cleaning and restoring plastic articles such as soft contact lenses such as hydrophilic gel lenses made of polyhydroxylated alkyl methacrylate and hydrophobic lenses made of flexible silicone rubber and to methods for use with conventional hard polymethylmethacrylate lenses.

In recent years, the advent of a great many plastic compositions has given rise to a need for cleaning and restoring articles made from them to their near-new state after they have been in use for a period of time. Many attempts have been made to restore these plastic articles to their new state with varying degrees of success.

The proper care of contact lenses can be viewed as requiring three necessary steps. First, after removal from the eye the lenses must be cleaned to physically remove foreign matter from their surfaces. Second, the lenses must be sterilized. Finally, the lenses must be prepared for insertion into the eye.

In the past, contact lenses have been made of hard polymethacrylates. Proper care of these lenses has required that they be stored in specially developed cleaning and storage solutions to maintain them in good order when not in use. The storage solutions are formulated to sterilize the lenses during the lenses' storage.

Recently, a new type of contact lens known as a soft lens has been developed. Soft lenses can be divided into two broad categories, namely hydrophilic soft contact lens and hydrophobic lenses.

Hydrophobic contact lenses are usually based on elastic and flexible silicone rubber (polysiloxane), and are generally made from cross-linked dimethyl polysiloxane which is commonly known as Antifoam A. A typical preparation of a hydrophobic silicone contact lens is disclosed in U.S. Pat. No. 3,228,741, which is hereby incorporated by reference and comprises forming a mixture of a suitable polymerization catalyst, up to 40% silica as a filler, and the siloxane polymer, and then moulding and curing with heat to further polymerize the polysiloxane by cross-linking to produce the finished clear lens. Clinical testing of flexible silicone rubber lenses has created a need for cleaning techniques that can be effectively used with these lenses.

Hydrophilic soft contact lenses are hydrated gel lenses which can be prepared by copolymerizing hydrophilic organic monomers having an olefinic double bond with a small amount of a cross-linking agent usually having two polymerizable, olefinic double bonds. These lenses are usually based on polyhydroxylated alkyl methacrylates and contain a polyhydroxylated alkyl methacrylate, such as polyhydroxyethyl methacrylate, cross-linked with, for example, a hydroxyethyl dimethylacrylate. Usually, there is about one (1) cross-linking molecule for every 200 monomer units. By comparison, the conventional hard contact lens consists of polymethylmethacrylate crosslinked with hydroxyethyl dimethylacrylate. The absence of a hydrophilic OH group in conventional hard lenses accounts for the tremendous difference in behavior of the two materials.

Hydrated gel lenses can contain the following materials: (1) hydroxyethylmethacrylate (HEMA) or its analogues, (2) ethylene-glycol dimethacrylate (EGMA) or its analogues, (3) polymethylmethacrylate (PMMA) or its analogues, (4) polyvinylpyrrolidone (PVP), (5) traces of the respective monomers, (6) traces of inhibitors such as hydroquinine, (7) traces of catalysts such as benzyl peroxide, and (8) water. A more detailed description of hydrated gel lenses is found in U.S. Pat. Nos. 2,976,576; 3,220,960; 3,361,858; 3,408,429; 3,496,254; and 3,499,862, which patents are hereby incorporated by reference.

Many different cold detergent solutions have been formulated and tried for cleaning plastic articles such as hard contact lenses and hydrophilic gel lenses, and have met with varying degrees of success. For example, the compositions disclosed in U.S. Patent application Ser. No. 279,800, filed Aug. 11, 1972, entitled "Contact Lens Cleaning, Storing and Wetting Compositions", and assigned to the same assignee as the present application, have a certain amount of beneficial cleaning effect. The continued and repeated use of such compositions has the distinct effect of keeping dirt from accumulating on or in the plastic articles. These compositions, however, have limited restorative action on badly neglected, discolored or severely protein encrusted plastics. Hydrophilic gel lenses are particularly susceptible to severe protein encrustations because such lenses are often subject to a heat treatment, such as boiling in saline, to sterilize the lenses. The heat treatment of hydrophilic gel lenses that have not been adequately cleaned prior to the heat treatment to remove coatings of tear proteins, however, can denature the proteins and make subsequent removal of the proteins more difficult.

Plastic components that cannot be restored often must be discarded after a relatively short period of use despite the fact that they are not physically damaged. Many contact lenses must be discarded because of a marked decrease in light transmission or because of color development in the lenses. None of the detergents available today can reverse color changes taking place in the plastic. The dirtying and discoloration of plastic contact lenses of both the hard and flexible type is a continuing problem in the contact lens industry.

Chemical evidence indicates that debris and color found on or in contact lenses is caused primarily by the following factors: (a) proteins and mucoproteins having isoelectric points at various pH's ranging from the acid end to the alkaline end of the pH scale; (b) insoluble metal salts of various acidic ions; (c) insoluble organic salts resulting from the interaction and precipitation of organic acids and organic bases; (d) insoluble inorganic oxides, for example, $Hg_2O$ and $H_gO$, arising through decomposition of preservatives like thimerosal sodium, often present in contact lens solutions as a preservative; (e) organic and inorganic coloring materials found in cosmetics; (f) oxidation products containing chromophoric groups arising from ingredients in tear, perspiration and other body fluids; and (g) a variety of unidentified water insoluble debris coming from the environment.

Accordingly, there has been a continuing search for a composition and regimen which would clean and bleach lenses worn by patients for extended periods of time without physically destroying the lenses and without causing any physiologic damage to the cornea when the lenses are worn again after the treatment.

SUMMARY OF THE INVENTION

It has now been found that synthetic plastic articles can be cleaned by successively contacting the article with a first aqueous solution and then a second aqueous solution, with each solution containing an active oxygen yielding per compound and one of the solutions being acidic and the other of the solutions being basic. The article is removed from the second solution, connected with a non-ionic detergent, and then rinsed with water. Preferably, the first and second solutions each contain a chelating agent.

When the article being treated can withstand boiling temperatures, such as a hydrophilic gel lens, the article preferably is boiled in both the first and second solutions. When the article being treated is a plastic that cannot be boiled, such as a conventional hard lens, it can be cleaned by eliminating the boiling steps and extending the length of time that the article is in contact with the acidic and/or basic solutions. Flexible silicone lenses can withstand boiling temperatures, but are preferably treated at lower temperatures, such as room temperature, for about 4 to 6 hours because boiling has a tendency to remove the hydrophilic coating that is normally applied to such lenses.

In some instances, the ingredients of the acidic and basic solutions can be combined in a single solution, and the article can be cleaned in this solution with one boiling cycle. In such a single solution, the acid and basic active oxygen yielding per compounds individually comprise from 0.1% to 10% of the solution. The use of a single solution, however, does not always produce acceptable results. The single solution can have a pH of from 2 to 11 and is usually used at an acid or basic pH. When acceptable results are not obtained, a second solution having a pH opposite that of the first can be used.

When the article being treated is a hydrophilic gel lens, it is preferably equilibrated in an isotonic environment and sterilized prior to being worn by a patient. Equilibration and sterilization can be performed as two separate steps or in a single step as described in greater detail below.

In accordance with a preferred embodiment of the present invention, when the article is made of a hydrophilic gel plastic it is alternately expanded and contracted to aid in removing debris by controlling certain process conditions. Process conditions which cause expansion include the use of hypotonic solutions, alkaline solutions and heat. Process conditions which cause contraction include the use of hypertonic conditions and acidic solutions.

The present invention restores discarded lenses routinely to their near-new state while retaining their original physical state as well as patient comfort and safety. Lenses or plastic components which are physically torn, cracked, worn or eroded, of course, are not worth treating because they cannot be restored for continued use.

The invention consists in the novel compositions, methods, products and improvements shown and described. It is to be understood that both the foregoing general description and the following detailed description are exemplary and explanatory but are not restrictive of the invention.

DETAILED DESCRIPTION OF THE INVENTION

The method of this invention includes as a first step the contacting of the article to be cleaned with a first aqueous solution containing an active oxygen yielding peroxy compound. The pH of the first solution is either alkaline or acidic, and is not neutral.

The inert nature of water, and the fact that it is a good solvent for the other ingredients in the first solution, together with its ready availability, make it the desirable base material for this solution. The water used in the solution can be ordinary tap water, but preferably water purified by distillation, filtration, ion-exchange or the like is used. It is especially desirable to use purified water when the article to be cleaned is a hydrophilic gel contact lens or other plastic prosthetic which makes direct contact with living tissue.

In accordance with this invention, an active oxygen yielding per compound is provided in the first solution. Active oxygen yielding compounds for use in the present invention preferably are water soluble peroxygen compounds and are used in the present invention in amounts ranging from 0.1 to 15% by weight, preferably 1 to 10%, based on the total volume of the solution. The per compounds are bleaching agents that impart a high level of cleaning and bleaching power to the solutions of the present invention. The per compounds derive their bleaching power from the release of active oxygen. The active oxygen yielding compound can be in the form of metal peroxides, percarbonates, persulfates, perphosphates, peroxyacids, alkyl peroxides, acyl peroxides, peroxyesters and perborates such as alkali metal perborates. Exemplary of suitable active oxygen yielding compounds for use in this invention are hydrogen peroxide, urea peroxide, benzoyl peroxide, lauroyl peroxide, peroxyacetic acid, sodium peroxydisulfate, di-tert-butyl peroxide, methyl ethyl ketone peroxide, sodium peroxide, sodium perborate, sodium and potassium percarbonate, and sodium and potassium monopersulfate. Mixtures of two or more of these compounds can be used in the first solution of this invention. The selection of a particular peroxy compound for use in the solutions of the present invention is governed by its ready availability, dissolution in water, safety, shelf-life, and the nature of the residue remaining after the release of active oxygen. Peroxy compounds that form residues that are essentially non-additive to the article being treated and/or living tissue and which can be readily removed are especially useful in the present invention.

In accordance with a preferred embodiment of the invention, the first solution contains a chelating agent. The chelating agents preferably are amino carboxylic acid compounds or water-soluble salts thereof. Examples of chelating agents which can be used in the solutions of this invention are ethylene diamine tetra-acetic acid, nitrilo triacetic acid, diethylene triamine penta-acetic acid, hydroxyethyl ethylene diamine triacetic acid, 1,2-diaminocyclohexane tetra-acetic acid, amino diacetic acid, and hydroxyethyl amino diacetic acid. These acids can be used in the form of their water-soluble salts, particularly their alkali metal salts. Especially preferred as a chelating agent are the di-, tri- and tetra-sodium salts of ethylene diamine tetraacetic acid. Other chelating agents such as citrates and polyphosphates can also be used in the present invention. The citrates which can be used in the present invention include citric acid and its mono, di and tri alkaline metal salts. The polyphosphates which can be used include, pyrophosphates, triphosphates, tetraphosphates, trimetaphosphates, tetrametaphosphates, as well as more highly condensed phosphates in the form of the neutral or acidic alkali metal salts such as the sodium and potassium salts as well as the ammonium salt. Preferred phosphates are alkali metal triphosphates and their mixture with pyrophosphates.

The chelating agents used in the present invention act as a water softening agent and tie up divalent and trivalent cations often present in water, thereby preventing undesirable precipitates from forming and ultimately fogging the surface of the article being treated. This function of the chelating agent is extremely useful when treating contact lenses to bring about chelation of calcium, iron and mercury ions and the like. The amount of chelating agent used will generally be between 0.001 to 5 weight percent, based on the volume of the solution, and preferably is between 0.1 to 2 weight percent. As described in greater detail hereafter, chelation can also be accomplished by employing chelating agents in various other treating steps that can be used in the present invention.

The first solution can be conveniently prepared by forming a mixture of the chelating agent and active oxygen yielding compound, and then dissolving this mixture in an appropriate amount of water.

In accordance with the invention, the pH of the first solution is controlled to be either acidic or basic. The acidity or basicity of the first solution can be controlled by a variety of means including using mixtures of acidic and basic peroxy compound and choosing appropriate ratios of these compounds, choosing appropriate acidic or basic chelating agents, and by adding dilute solutions of inorganic and organic acids and bases. For example, aqueous solutions containing 5% hydrochloric acid, 5% acetic acid or 5% sodium hydroxide can be added to the first solution to achieve an appropriate pH. The acids and bases that can be added are those that do not cause damage to the plastic article being treated and do not have a potential for adverse physiologic effect when the article is contacted with living tissue. Trisodium ethylene diamine tetraacetate is especially useful in maintaining the pH of the first solution at alkaline levels when it is present in the solution at levels of 0.01 to 2%.

When the pH of the first solution is acidic, the solution should have a pH between 1 and almost but less than 7, preferably 2 to 5. When the pH of the first solution is basic, the solution should have a pH between greater than 7 and up to about 12, preferably 8.0 to 10.5. Extremely acid or extremely basic solutions should be avoided because they could be detrimental to the physical integrity of a number of plastic compositions when such solutions are applied to articles made from these plastics at elevated temperatures of, for example 100°C or higher, for unduly prolonged time periods of 6 or more hours. The solutions and operating conditions of the present invention thus are formulated to routinely clean and bleach plastics but not to induce any drastic physically destructive changes in the plastic article.

The article to be treated is contacted with the first solution by immersing it in the solution. For example, a contact lens could be immersed in from 1 to 100 ml of the first solution. The solution can be maintained at room temperature or heated up to about 100°C. Preferably, when the plastic article can withstand elevated temperatures, the first solution is heated because the use of elevated temperatures can loosen dirt and/or increase the rate of chemical reactions between the active oxygen yielding compound and chromophores on the article and thereby considerably reduce the amount of time for treatment in the first solution. Hydrophilic gel lenses can withstand elevated temperatures and generally are immersed in the first solution and boiled therein for from about 2 minutes to several hours such as up to 2 hours. Generally, boiling for ten to thirty minutes in the first solution produces good results. When the plastic article cannot withstand elevated or boiling temperatures, it is usually necessary to leave it in the first solution for longer periods of time of from 4, preferably 6 to 48 hrs. Flexible silicone lenses generally are treated in the first solution for about 4 to about 6 hours at temperatures below boiling, such as room temperature. Flexible silicone lenses can withstand boiling temperatures, but boiling has a tendency to remove the hydrophilic coating that is normally applied to such lenses. Thus, the flexible silicone lenses can be boiled in the practice of the present invention, but then it may be necessary to recoat the lenses to apply a new hydrophilic coating.

In accordance with the invention, the plastic article is removed from the first solution and then contacted with a second aqueous solution containing an active oxygen yielding peroxy compound. The solution preferably contains a chelating agent. The pH of the second solution is acidic when the pH of the first solution is alkaline, and is alkaline when the pH of the first solution is acidic. The second solution for treating the plastic articles is generally similar to the first solution except that the pH of the second solution is controlled to be opposite that of the first solution so that the plastic article will be subjected to both a basic and acidic solubilization. Thus, the same active oxygen yielding peroxy compounds and chelating agents can be incorporated in the second solution that are used in the first solution and in the same amounts. The second solution is made acidic or basic in the same manner as the first solution, that is, by selection of suitable ratios of acidic and basic peroxy compounds, choice of acidic or basic chelating agents, and addition of dilute solutions of inorganic and organic acids and bases. The acid and basic pH ranges of the second solution correspond to those that can be used for the first solution. Thus, when the pH of the second solution is acidic, it should have a pH between 1 and almost but less than 7, preferably 2 to 5. When the pH of the second solution is basic, it should have a pH between greater than 7 and about 12, preferably 8 to 10.5.

The plastic articles generally are treated in the second solution in the same manner and for the same length of time as in the first solution. Thus, they are immersed in the second solution, and where the article can withstand elevated temperatures, the second solution is heated and preferably boiled to bring about rapid cleaning of the article.

Dirty plastic articles, such as dirty lenses worn by different patients, often have quite different dirt compositions. Accordingly, in some usages, the bulk of dirt will be removed by either the first solution alone or the second solution alone. When the bulk of the dirt is removed by the first solution alone, boiling during the use of the second solution can be eliminated. The method of this invention works equally as well as in producing cleaning articles when the first solution is acidic and the second solution basic as when the first solution is basic and the second solution is acidic.

After the article is removed from the second solution, a non-ionic detergent cleaner is applied to it to emulsify and solubilize dirt. The article is then rinsed with cold water, purified water or saline until all of the nonionic detergent cleaner is rinsed away. Preferably, the non-ionic detergent cleaner is that described at pages 25 to 29 of the above referred to co-pending U.S. application Ser. No. 279,800 which application is hereby incorporated by reference. The cleaning composition described in Ser. No. 279,800 comprises 0.01 to 40% of a poly(oxyethylene)-poly(oxypropylene) block copolymer, a sufficient amount of a germicidal composition containing sorbic acid to preserve the sterility of the solution, a sufficient amount of at least one water soluble compatible salt to provide a solution having a tonicity compatible with human tear fluid, and a balance of water. The block copolymers have a molecular weight between about 1700 and 15,500 and a water solubility in excess of about 10 grams per 100 ml. Additionally, these block copolymers have a cloud point in 1% aqueous solution above about 30°C and a Foam Height in excess of 30 mm.

As described in Ser. No. 279,800, these non-ionic detergent solutions can be formulated for use with hydrophilic gel lenses, flexible silicone lenses, and conventional hard polymethylmethacrylate lenses. A particularly useful composition for hydrophilic gel lenses, hereafter referred to as Cleaner A, is described in Example 4 of Ser. No. 279,800 and comprises 18% polyoxyethylene-polyoxypropylene condensate (Pluronic F-127 sold by Wyandotte Chemical Corp.), 0.1% sorbic acid N.D.XIII (Specification set forth in the official thirteenth revision of the National Formulary published by the American Pharmaceutical Association), 0.5% disodium EDTA as a chelating agent, 0.65% sodium chloride, 0.20% potassium chloride and balance deionized water. Other commercially available compositions containing non-ionic detergent cleaners such as Preflex (Barton Parsons Co.) and Soft-Mate (Barnes Hind Ophthalmics, Inc.) also can be used in this step of the invention to clean the hydrophilic gel lenses. These latter cleaners however contain thimerosal sodium as a preservative which may induce allergic ocular responses.

When conventional hard polymethylmethacrylate lenses are used, the cleaning composition can be any of the many commercially available cleaning compositions for such lenses. Preferably, the cleaning composition for hard lenses is that described at pages 20 to 25 of Ser. No. 279,800, and especially the gel form cleaning composition as exemplified by Example 7 of that application. This gel form cleaning composition is hereafter referred to as Cleaner B and comprises 0.025% benzalkonium chloride U.S.P., 0.25% trisodium EDTA as a chelating agent, 20.0% polyoxyethylene-polyoxypropylene condensate (Pluronic F-127), and balance deionized water. Silicone lenses can be cleaned in this step of the invention with any of the cleaning compositions described in Ser. No. 279,800 as being useful for silicone lenses or with the cleaning compositions for conventional hard lenses just described such as Cleaner B.

After the plastic article is rinsed with water, it is cleaned, bleached and has a new look approaching the original physical state of the article. The cleaning treatment of this invention is extremely useful in restoring contact lenses to a near new state without physically polishing the lenses on a tool with a polishing compound. Polishing on a tool can destroy the optics of a lens as well as the edge finish, but the rennovating achieved by the cleaning treatment of this invention avoids these problems. The physical dimensions and optics of lenses are not changed by the cleaning treatment of this invention.

The chelating agents of the first and second solutions can be omitted from these solutions if desired. When the chelating agents are omitted, however, the lenses preferably are given additional treatment to insure that the lenses are cleaned. Thus, for example, gel lenses can be maintained in the first and second solutions for longer times of from 5 to 15 minutes extra at boiling temperature. Also, the lens can be cleaned with a non-ionic cleaner containing a chelating agent and rinsed with water after it is removed from the first solution in addition to the usual application of nonionic cleaner after removal from the second solution.

After rinsing to remove the cleaning composition applied after use of the second peroxy solution, the lens is preferably treated to remove residual components that may have been imparted to the lens by the previous various treatment steps. These residuals can include EDTA, sulfate and borate ions, sorbic acid, polyoxyethylene glycol surfactants and the like. Preferably, the treatment to remove residuals also imparts a desired tonicity to the lens. Removal of residuals and control of tonicity to be compatible with human serum and tear fluid is especially important when the lens is a hydrophilic gel lens. Preferably, with hydrophilic gel lenses, the tonicity is controlled to be isotonic with human serum and tear fluid, that is, they are formulated to contain the same salt concentration as that present in the serum and tear fluid of the user. The normal tonicity of human serum and tear fluid is 0.9% (9.0 grams of sodium chloride per liter of fluid). Tonicity control and removal of residuals can be achieved by use of isotonic solutions which contain approximately 0.9% sodium chloride, or other salt or mixture of salts having a tonicity approximately equivalent to that of 0.9% sodium chloride. Deviations of plus or minus 20% (0.72 – 1.08% tonicity) can be made, but any greater deviation would cause undesirable differences in osmotic pressure between the natural fluids of the eye and the hydrophilic gel lens. The hydrophilic gel lens preferably is equilibrated in an open container in 10 to 100 ml of isotonic physiologic saline solution for a minimum of 5 and preferably 10 to 20 minutes at a boiling temperature or 1 to 2 hours at room temperature.

As will be apparent to those of ordinary skill in the art, any soluble salt or mixture of salts compatible with ocular tissue can be used to provide the desired tonicity. Preferably, sodium chloride, potassium chloride, or mixtures thereof, are used to provide the desired tonicity. It is to be understood, however, that one or more essentially neutral water soluble alkali metal salts can be substituted in whole or in part for the sodium or potassium chloride. Thus, other alkali metal halide, such as sodium bromide, potassium fluoride or potassium bromide can be used. Other salts such as sodium sulfate, potassium sulfate, sodium nitrate, sodium phosphate, potassium nitrate or potassium phosphate can also be used.

An especially useful isotonic composition to control the tonicity of hydrophilic gel lenses and remove residuals is described in co-pending U.S. Pat. application Ser. No. 315,793 at page 26 as "Solution B" and comprises 0.1% sorbic acid, 0.1% trisodium edetate, 0.75% sodium chloride, 0.20% potassium chloride, 5% sodium hydroxide solution to adjust pH to 7.4 and purified water Q.S. to make 100.0%.

Variations in osmolarity play a significant part in causing hydrophilic gel lenses to swell and contract. Thus, for example, hypertonicity causes a shrinking (less water) in hydrophilic gel plastics and hypotonicity causes an expansion of these plastics. Treatment of a hydrophilic gel lens to bring about a final isotonic lens help insure that the lens diameter and other physical dimensions of the treated lens will be the same and nearly the same as the new condition of the lens.

In accordance with a preferred embodiment of the invention, when the article is made from a hydrophilic gel plastic, such as a gel lens, it is alternately expanded and contracted to aid in removing debris. It has been found, in accordance with the teachings of the present invention that alternately changing the lens size aids in loosening and removing dirt and other debris. The lens can either be expanded and then contracted or contracted and then expanded to bring about the changes in lens size. These changes can be achieved by controlling various process steps that occur during the overall treatment of the lens.

Process conditions which cause expansion of a hydrophilic gel plastic include the use of hypotonic solutions, alkaline solutions and heat. Process conditions which cause contraction include the use of hypertonic solutions and acidic solutions. Thus, by controlling the tonicity, alkalinity and temperature of the various solutions used during the practice of the present invention, the gel lenses can be made to alternately expand and contract from one treatment step to the next. For example, control of osmolarity preferably is performed during the treatment with the first and second peroxy containing aqueous solutions to alternately provide swelling and contraction or contraction and swelling of the hydrophilic gel plastic. Where contraction is desired, the tonicity of either the first or second solution is controlled to contain more than the equivalent of 0.9% soduim chloride by adding to the solution inert water soluble salts, for example, sodium chloride, potassium chloride, and the corresponding sulfates, phosphates, and nitrates. The solution may be controlled to have an osmolar effect equivalent to for example 1.3% or higher to 10 to 20% sodium chloride. This extreme in osmolarity aids in shrinking a lens markedly and thus aids in loosening foreign debris trapped in the matrix of the plastic lens. For example, an osmolarity of 20% sodium chloride could shrink a lens having an initial lens diameter of 15 mm to a lens diameter of 9 mm. Where expansion is desired, the tonicity of either the first or second solution is controlled to contain less than the equivalent of 0.9% sodium chloride for example 0 to 0.5%, by eliminating the above mentioned inert water soluble salts from the solution. Purified water provides an excellent hypotonic environment and causes a significant amount of swelling in a gel lens. Accordingly, when a treatment step requires that a lens be rinsed with water, purified water preferably is used when a swelling of the lens is desired. The tonicity of the solution generally has a greater effect than the pH in determining whether it will have an expanding or contracting effect on the gel plastic.

After the desired tonicity is achieved in the cleaned, bleached and rinsed lens, it is preferably sterilized in accordance with conventional techniques. Thus, for example, hydrophilic gel lenses can be sterilized by boiling in saline or by chemical reaction. Boiling in saline to sterilize the hydrophilic gel lens is performed in a closed system where air and other contaminating materials cannot enter the system and is thus distinguished from the previously described step of boiling in saline in an open system to remove residuals and control tonicity. The boiling in saline to sterlize, however, can be used to bring about the desired removal of residuals and tonicity, if this step is performed with large amounts of solution at high temperature and pressure. A preferred chemical sterilization treatment is that described in my co-pending U.S. Patent application Ser. No. 315,793 entitled "Iodine Composition and Dissipating Solution" and filed Dec. 18, 1972 which application is hereby incorporated by reference. Briefly, this treatment uses an aqueous antiseptic iodophor solution containing from about 0.00005% to about 10% by weight iodine, from about 0.0001% to about 20% by weight of a water soluble iodide salt, from about 0.001% to about 25% by weight polyvinyl alcohol, from about 0.001% to about 10% by weight boric acid, and the remainder solely water or other ingredients which will impart special properties. This self-sterilizing solution is desirably used in combination with an aqueous dissipating solution for dissipating the available iodine at a controlled rate which dissipating solution comprises from about 0.01% to about 5% by weight sorbic acid or a water soluble salt thereof and from about 0.01% to about 5% by weight ethylenediaminetetraacetic acid or a soluble salt thereof. From 1.0% to about 10% of sterilizing solution can be combined with from about 99% to about 90% by weight of dissipating solution to form an especially preferred solution for treating gel lenses. The lens is treated in this combined solution for a minimum of about 15 minutes to 2 hours or longer.

Treating of silicone lenses and conventional hard lenses to remove residuals and provide a desired tonicity ordinarily can be accomplished by applying a conventional isotonic wetting solution to them after they have been rinsed free of the non-ionic cleaner that is applied after the second peroxy solution. After application of the wetting solution, the lens can be inserted in the eye. The wetting solution for these lenses need not be isotonic and can have tonicities equivalent to about 0.5 to 1.8% sodium chloride. These lenses, of course, can be kept in known and conventional storing and soaking solutions prior to application of the wetting solution. The known and conventional storing and soaking solutions can sterilize these lenses.

The method of this invention achieves excellent and unexpected results in the cleaning of dirty, discolored plastics of various compositions which would otherwise have to be discarded. The cleaning method of this invention primarily is intended for use on those plastic articles which have been neglected and have not been cleaned in accordance with routine or daily cleaning procedures which if followed would keep the articles in satisfactory condition but which cannot clean the articles once they become neglected. The cleaning method of the present invention is a practical contact lens office procedure. Patients can bring their lenses in for rejuvination by their fitter whenever the need arises. Further, intelligent patients can be taught and allowed to treat their lenses at home every 3 to 6 months or when required, particularly if their daily prophylactic cleaning is not followed or is inadequate.

For a clearer understanding of the invention, specific examples of it are set forth below. These examples are merely illustrative and are not to be understood as limiting the scope and underlying principles of the invention in any way. All parts and percentages referred to in this specification and the appended claims are by weight in terms of unit volume of solution unless otherwise specifically indicated. For example, a sodium perborate content of 0.1 percent in the solution is equivalent to one gram of sodium perborate per liter of solution.

EXAMPLE 1

An acidic peroxy contact lens cleaning composition for hydrophilic gel lenses is prepared by forming a mixture containing, on a weight basis, 98 weight percent potassium monopersulphate and 2 weight percent monosodium edetate and then dissolving one (1) gram of the mixture in 20 ml of water. The resulting solution is hypertonic and has a pH of about 2. A dirty hydrophilic gel lens having an initial lens diameter of 15 mm in a neutral isotonic salt solution at room temperature is added to the solution and the solution is boiled for 15 minutes. After this treatment, the lens is removed and comes out considerably cleaner. The lens diameter upon removal from the acidic solution is 12.8 mm at room temperature.

The lens is then transferred to a hypotonic second solution having a basic pH of about 10. The second solution is made by dissolving 1 gram of a dry powder in 20 ml of water. The dry powder, based on its weight, consists of 98% by weight of sodium perborate and 2% by weight of tetrasodium edetate. The lens is boiled in the second solution for fifteen minutes and then taken out. The lens diameter upon removal from the second solution is 15.5 mm at room temperature.

The lens is cleaned with an isotonic nonionic cleaner (Cleaner A described above) whereupon the lens diameter returns to 15.0 mm. The lens is then rinsed with room temperature purified water which swells the lens diameter to 16 mm. The treated lens is now remarkably cleaner than the dirty lens. The above cycle can be repeated if desired to bring about further improvements in the lens. The lens is next placed in 15 ml of a neutral isotonic 0.9% sodium chloride solution where it is boiled for 15 minutes to accelerate equilibration and removal of residuals. Upon cooling, the lens again returns to its original lens diameter of 15 mm. The lens is now ready for sterilization and wearing.

The above cycle is used on a number of dirtied lenses and they all exhibit good cleanliness after the treatment.

EXAMPLE 2

A commercial 3% hydrogen peroxide solution containing 0.2% nitriloacetic acid and having a pH of 3 is used to clean a dirty, yellow, discarded hydrophilic gel lens. The lens is placed in 30 ml of the solution, boiled in the solution for 30 minutes, and removed.

The lens is then transferred to a second solution having a basic pH of 11. The second solution is made by adding 2 grams of a mixture containing sodium percarbonate, sodium chloride and trisodiumdiethylenetriamine penta-acetic acid to 20 ml of water. The mixture contains, based on its weight, 80 weight percent sodium percarbonate, 19 weight percent sodium chloride, and 1 weight percent of the trisodiumdiethylenetriamine penta-acetic acid. The lens is boiled in the second solution for 10 minutes and then removed. The lens is then cleaned with a non-ionic cleaner, Cleaner A, and rinsed with water. The lens is now clean and colorless.

The lens is then equilibrated in an isotonic physiologic saline solution, sterilized by boiling, and worn by a patient. The patient reported that the lens looked and felt as a new lens.

EXAMPLE 3

A basic peroxy contact lens cleaning solution for hydrophilic gel lenses is prepared by adding 2 grams of a mixture containing potassium persulfate, sodium perborate and disodium edetate to 20 ml of water. The mixture contains, on a weight basis, 75 weight percent potassium persulphate, 20 weight percent sodium perborate and 5 weight percent disodium edetate. The resulting solution has a pH of 4.5 and is adjusted to a pH of 8.5 by addition of 5 weight percent sodium hydroxide.

A dirty, discarded, hydrophilic gel lens is placed in 20 ml of the solution and the solution is heated at about 75°C for 30 minutes. After this treatment, the lens is removed.

The lens is then transferred to a second solution having an acidic pH of about 4.0. The second solution is prepared in an identical manner to the first solution except that the pH is adjusted to 4.0 instead of 8.5 by addition of 5 weight percent acetic acid. The lens is boiled in 20 ml of the second solution for 15 minutes and then removed. The lens is then cleaned with a nonionic cleaner (Cleaner A) rinsed with water, and equilibrated in 30 ml physiologic saline for 2 hours at room temperature. The lens is then placed in the transfer unit portion of a contact lens cleaning and storage device of the type shown in U.S. Pat. No. 3,519,005 and U.S. Pat. No. 3,645,284. Four ml of a sterile preservative dissipating solution and 4 drops of a concentrated disinfectant solution (both described at page 26 of U.S. Ser. No. 315,793) are added to the device to disinfect and sterilize the lens. The lens is kept in the combined solution overnight. The composition of the concentrated disinfectant solution used is:

| | |
|---|---|
| Iodine | 0.1% |
| Potassium Iodide | 0.2% |
| Polyvinyl alcohol (Elvanol 5105) | 2.5% |
| Boric Acid | 0.5% |
| Purified Water Q.S. to make | 100.0% |

The composition of the sterile preservative dissipating solution used is:

| | |
|---|---|
| Sorbic Acid | 0.1% |
| Trisodium Edetate | 0.1% |
| Sodium Chloride | 0.75% |
| Potassium Chloride | 0.20% |
| 55% Sodium Hydroxide Solution to adjust pH to | 7.4 |
| Purified Water Q.S. to make | 100.0% |

The sterility of the preservative dissipating solution is insured by heating.

After sterilization, the lens is inserted in a patient's eye, and is remarkably comfortable and clean, almost like new.

The above cleaning cycle is repeated with eight other lenses with similar results.

EXAMPLE 4

This example illustrates the use of a single cleaning solution to clean a hydrophilic gel lens. Three grams of a mixture containing, on a weight basis, 50 weight percent potassium monopersulphate, 20 weight percent sodium chloride, 25 weight percent sodium perborate, and 5 weight percent disodium edetate are added to 50 ml of water. The pH of the resulting solution is 6.

A dirty, orange, discarded gel lens is boiled in 50 ml of the solution for 45 minutes. The lens is removed, further cleaned with a nonionic cleaner (Cleaner A) and rinsed with water. The thus treated lens is clean and shows no changes in its physical dimensions and optics. It is equilibrated in sterile neutral isotonic solution for 1 hour and worn by a patient.

Other lenses worn by different patients, and probably containing dirts of differing compositions, did not always come out perfectly clean following this treatment. In these instances, additional treatment with a basic peroxy composition having a pH of 7.5 to 11.0 cleaned off the remaining foreign debris.

EXAMPLE 5

This example illustrates the use of a single cleaning solution to clean a conventional hard contact lens. One gram of a mixture containing, on a weight basis, 30 weight percent potassium monopersulphate, 69 weight percent sodium perborate, and 1 weight percent trisoidum edetate are added to 10 ml of water. The pH of the resulting solution is 8.0. A very dirty, protein encrusted, discarded conventional hard contact lens is placed in the solution and stored in it for 24 hours. The lens is removed and cleaned with a commercial non-ionic cleaner (Cleaner B described above) by gentle rubbing and water rinsing. The lens is very clean and has a new look. A wetting solution is applied and the lens may be worn safely and comfortably.

EXAMPLE 6

A basic peroxy contact lens cleaning solution for hydrophilic gel lenses is prepared by adding 4 grams of sodium perborate to 80 ml of water. Twelve hydrophilic gel lenses are boiled in this solution for 15 minutes. The lenses are then transferred to a second acidic peroxy contact lens cleaning solution prepared by adding 4 grams of potassium monopersulfate to 80 ml of water. The twelve lenses are boiled in the second solution for 15 minutes and then are taken out. The lenses are then cleaned with a non-ionic cleaner, Cleaner A, and rinsed with cold tap water.

The lenses are equilibrated to be isotonic and residuals are removed by a variety of treatments. In one treatment, a lens is placed in a 5 ml solution of isotonic normal saline at room temperature for 1 hour. In another treatment, a lens is placed in 5 ml of an isotonic dissipating solution comprising the disinfectant solution described in Example 3 above for 1 hour at room temperature. In still another treatment, a lens is placed in 5 ml of isotonic normal saline and kept in the solution for 5 minutes at a temperature of 100°C. In still another treatment, a lens is placed in 5 ml of the dissipating solution described in Example 3 above and kept in the solution for 15 minutes at a temperature of 100°C. Tests for the presence of residuals show that the lenses treated in accordance with the above techniques contain a maximum of 0.0001% residuals.

The above treated lens can now be sterilized and then worn by a patient.

EXAMPLE 7

A basic peroxy contact lens cleaning solution for hydrophilic gel lenses is prepared by adding 3 grams of sodium perborate to 50 ml of distilled water. Twenty hydrophilic gel lenses are boiled in the solution for 15 minutes. The lenses are removed from the solution and cleaned with nonionic Cleaner A by rubbing with the index finger of one hand in the palm of the other hand. The lenses are rinsed thoroughly with distilled water.

The lenses are then placed in a second acidic peroxy contact lens cleaning solution prepared by adding 3 grams of potassium monopersulfate to 50 ml of distilled water. The lenses are boiled in the second solution for 15 minutes and then are taken out. The lenses are removed from the solution and cleaned with a nonionic Cleaner A by rubbing with the index finger of one hand in the palm of the other hand. The lenses are rinsed thoroughly with distilled water.

Each lens is placed in a 5 ml glass vial containing normal saline, U.S.P. buffered with sodium bicarbonate. The vials are closed with a silicone rubber stopper and crumped with an aluminum seal. The vials are then autoclaved for 15 minutes at 250°F and 5 lbs. pressure.

Tests for the presence of residuals show that the lenses do not contain any significant quantities of residues. The tests indicate that there are minimal levels of boron and sulfate, no sorbic acid, and no other volatile organic compounds.

EXAMPLE 8

A basic peroxy contact lens cleaning solution is prepared by adding 1 gram of sodium perborate to 40 ml of water. A flexible silicone lens is placed in the solution and kept in the solution for 2 hours at 60°C. The lens is removed from the solution and then cleaned with a nonionic cleaner, Cleaner B, and rinsed with cold tap water. The lens is then transferred to a second acidic peroxy contact lens cleaning solution prepared by adding one gram of potassium monopersulfate to 40 ml of water. The lens is kept in this solution for two hours at 60°C. The lens is removed from the second solution and again cleaned with Cleaner B and rinsed with cold tap water. A wetting solution is applied to the lens and it can now be worn safely and comfortably.

The invention in its broader aspects is not limited to the specific details shown and described and departures may be made from such details without departing from the principles of the invention and without sacrificing its chief advantages.

What is claimed is:

1. A method of cleaning plastics wherein said plastics are suitable for use in hard and soft lenses comprising:
   a. successively contacting the plastic with a first aqueous solution and then a second aqueous solution, with each solution containing an active oxygen yielding per compound in a concentration of 0.1 – 15% by weight and one of said solutions being acidic and the other of said solutions being basic; and b. removing the plastic from the second solution, contacting it with a non-ionic detergent, and rinsing it with water.

2. The method of claim 1 wherein the per compound of the first and second solutions is independently selected from the group consisting of hydrogen peroxide, alkali metal perborates, percarbonates, perphosphates, persulfates, and peroxides.

3. The method of claim 1 wherein the peroxy compound of the first and second solutions is independently selected from the group consisting of potassium monopersulphate, sodium perborate, urea peroxide, sodium percarbonate and hydrogen peroxide.

4. The method of claim 1 wherein the first and second solutions independently contain 0.001 to 5 weight percent of a chelating agent.

5. The method of claim 4 wherein the chelating agent of the first and second solutions is an amino carboxylic acid or a water-soluble salt thereof.

6. The method of claim 4 wherein the chelating agent is selected from the group consisting of ethylene diemine tetraacetic acid, nitrilo triacetic acid, diethylene triamine penta-acetic acid, hydroxyethyl ethylene diamine triacetic acid, 1,2-diaminocyclohexane tetraacetic acid, amino diacetic acid, hydroxyethyl amino diacetic acid, and their water soluble alkali metal salts.

7. The method of claim 1 wherein the first solution is heated to a temperature in excess of room temperature but less than that which would initiate boiling.

8. The method of claim 7 wherein the article is boiled in the first solution.

9. The method of claim 7 wherein the second solution is heated to a temperature in excess of room temperature but less than that which would initiate boiling.

10. The method of claim 9 wherein the article is boiled in the second solution.

11. The method of claim 1 wherein the acidic solution has a pH of between about 1 and less than 7 and the basic solution has a pH of between greater than 7 and about 12.

12. The method of claim 1 wherein at least one of said solutions contains an inert water soluble salt to control the tonicity of the solution.

13. A method of cleaning a hydrophilic gel lens comprising:

a. successively contacting the lens with a first aqueous solution heated to a temperature in excess of room temperature but less than that which would initiate boiling and then a second aqueous solution, heated to a temperature in excess of room temperature but less than that which would initiate boiling with each solution containing an active oxygen yielding per compound in a concentration of 0.1 – 15% by weight and one of said solutions being acidic and the other of said solutions being basic; and b. removing the lens from the heated second solution, contacting it with a non-ionic detergent, and rinsing it with water.

14. The method of claim 13 wherein the first and second solutions are boiled.

15. The method of claim 13 wherein after rinsing, the lens is maintained in a given environment until the system comes to equilibrium in a solution isotonic with respect to a reference solution and sterilized.

16. The method of claim 15 wherein the first and second solutions are boiled.

17. The method of claim 15 wherein the first and second solutions independently comprise from 0.1 to 15 weight percent of said per compound and 0.001 to 5 weight percent of a chelating agent.

18. The method of claim 15 wherein the lens is alternately expanded and contracted to aid in removing debris and dirt.

19. The method of claim 18 wherein the tonicities of the first and second solutions, relative to a reference solution, are selectively maintained at desired levels to bring about the expansion and contraction.

20. The method of claim 18 where one of said first and second solutions is hypertonic relative to said reference solution to bring about contraction of the lens.

21. The method of claim 18 where one of said first and second solutions is hypotonic relative to said reference solution to bring about expansion of the lens.

22. The method of claim 18 where one of said first and second solutions is hypertonic with respect to a reference solution to bring about contraction of the lens and the other of said first and second solutions is hypotonic with respect to said reference solution to bring about expansion of the lens.

23. A method of cleaning an article made from a hydrophilic plastic comprising:

a. successively contacting the article with a first aqueous solution heated to a temperature greater than room temperature but less than that required to initiate boiling and then a second aqueous solution heated to a temperature greater than room temperature but less than that required to initiate boiling, with each solution containing an active oxygen yielding per compound in a concentration of 0.1 – 15% by weight and one of said solutions being acidic and the other of said solutions being basic;

b. removing the article from the heated second solution, contacting it with a non-ionic detergent, and rinsing it with water; and c. alternately expanding and contracting the article to aid in removing debris and dirt.

24. The method of claim 23 wherein the tonicities of the first and second solutions relative to a reference solution are selectively maintained at desired levels to bring about the expansion and contraction.

* * * * *